(12) United States Patent
Tobita et al.

(10) Patent No.: US 7,662,893 B2
(45) Date of Patent: Feb. 16, 2010

(54) METHOD FOR PRODUCING STABILIZED POLYMER

(75) Inventors: Etsuo Tobita, Saitama (JP); Naoshi Kawamoto, Saitama (JP); Takahiro Horikoshi, Saitama (JP)

(73) Assignee: Adeka Corporation, Tokyo (JP)

( * ) Notice: Subject to any disclaimer, the term of this patent is extended or adjusted under 35 U.S.C. 154(b) by 224 days.

(21) Appl. No.: 11/795,646

(22) PCT Filed: Mar. 6, 2006

(86) PCT No.: PCT/JP2006/304231

§ 371 (c)(1),
(2), (4) Date: Jul. 19, 2007

(87) PCT Pub. No.: WO2006/095667

PCT Pub. Date: Sep. 14, 2006

(65) Prior Publication Data

US 2008/0214752 A1 Sep. 4, 2008

(30) Foreign Application Priority Data

| Mar. 11, 2005 | (JP) | ............................ 2005-068985 |
| Aug. 24, 2005 | (JP) | ............................ 2005-242968 |

(51) Int. Cl.
*C08F 4/00* (2006.01)
(52) U.S. Cl. .................................................. 526/90
(58) Field of Classification Search .................... 526/90
See application file for complete search history.

(56) References Cited

U.S. PATENT DOCUMENTS

| 4,769,510 A | 9/1988 | Kaminsky et al. |
| 5,045,577 A | 9/1991 | Mulhaupt et al. |
| 5,574,118 A | 11/1996 | Olivier |
| 5,650,464 A | 7/1997 | Brunner et al. |
| 5,703,149 A | 12/1997 | Rotzinger et al. |

| 6,410,629 B1 | 6/2002 | Mullins et al. |

FOREIGN PATENT DOCUMENTS

| JP | 50-108385 | 8/1975 |
| JP | 57-63310 | 4/1982 |
| JP | 61-130314 | 6/1986 |
| JP | 61-181803 | 8/1986 |
| JP | 63-92613 | 4/1988 |
| JP | 2-53804 | 2/1990 |
| JP | 2-255810 | 10/1990 |
| JP | 4-230341 | 8/1992 |
| JP | 5-271335 | 10/1993 |
| JP | 5-320256 | 12/1993 |
| JP | 8-208731 | 8/1996 |
| JP | 9-12621 | 1/1997 |
| JP | 2000-517372 | 12/2000 |

*Primary Examiner*—Ling-Siu Choi
*Assistant Examiner*—Sonya Wright
(74) *Attorney, Agent, or Firm*—Young & Thompson

(57) ABSTRACT

A method for producing a stabilized polymer comprising adding at least one kind of a phenolic antioxidant masked with an organic aluminum and represented by general formula (I) in a catalyst system or a polymerization system, before or during polymerization, on gas-phase polymerization of a monomer having an ethylenic unsaturated bonding,

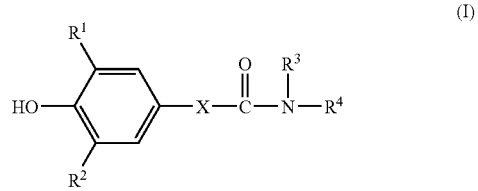

(I)

wherein $R^1$ and $R^2$, each is independently a hydrogen atom, an alkyl group having 1 to 9 carbon atoms, a cycloalkyl group or an arylalkyl group; X is an alkylene group having 1 to 8 carbon atoms; $R^3$ is a hydrogen atom or an alkyl group having 1 to 8 carbon atoms; and $R^4$ is an alkyl group having 1 to 30 carbon atoms.

20 Claims, No Drawings

METHOD FOR PRODUCING STABILIZED POLYMER

TECHNICAL FIELD

The present invention relates to a method for producing a stabilized polymer, which may largely reduce the consumption of energy required for stabilizing a polymer. In the method, a phenolic antioxidant having an amide bonding and masked by an organic aluminum is added to a catalyst system or a polymerization system before gas-phase polymerization to prevent polymerization inhibition.

BACKGROUND ART

Since polymers deteriorate due to heat or light, a phenolic antioxidant, a phosphoric antioxidant, a sulfuric antioxidant, a hydroxylamine compound, a hindered amine compound, a UV absorber, an acid scavenger, and others are generally added to the polymers.

For polyolefin polymerization reaction, Ziegler-Natta catalysts or metallocene catalysts are used, and in Patent Document 1, a so-called third-generation Ziegler-Natta catalyst has been proposed. After this proposal, as the development of catalysts proceeds, so-called fourth-generation and fifth-generation Ziegler-Natta catalysts as disclosed in Patent Document 2 and Patent Document 3, and a metallocene catalyst as disclosed in Patent Document 4 have been proposed. Conventionally, various kinds of stabilizers have been blended with a polymerized product and uniformly dispersed into it by melt-kneading and other processes to attain the long-term stabilization of polymers.

However, so as to achieve the stabilization, enormous energy is inefficiently consumed for blending various kinds of stabilizers by way of melt-kneading after polymerization. This energy is considered to be equal to amount to one third of the energy used for propylene production. Further in some cases, in order to address the defective dispersion of the stabilizers, a larger amount of stabilizers than necessary is required to be blended.

Among polymerization methods for producing a granular polymer product directly, a process for uniformly dispersing the stabilizers and an elimination of the kneading step by way of blending the stabilizers before or during polymerization has been proposed in Patent Documents 5 to 9 and others.

Patent Document 5 discloses a process for adding a hindered amine compound during polymerization or in the last phase of polymerization of an olefin polymer using a Ziegler-Natta catalyst, and shows that a more excellent stabilizing effect can be attained as compared with the process for adding a phenolic antioxidant on polymerization.

Patent Document 6 discloses a process of a-olefin polymerization in the presence of a phosphoric antioxidant, and shows that a more excellent stabilizing effect can be attained as compared with the process of post-addition because the antioxidant can be bonded to the inside of polymer particles homogeneously and uniformly, and that no extruder is needed for mixing the antioxidant.

Patent Document 7 discloses a process for using a hindered amine compound and a phosphoric antioxidant in combination in an olefin polymer polymerization system, and shows that a more excellent stabilizing effect can be attained as compared with the process of using solely the hindered amine compound.

Patent Document 8 discloses a process for using a catalyst having a specific ether compound as an internal electron donor, and shows that an excellent stabilizing effect can be attained when a phenolic antioxidant is used on polymerization and that the polymerization catalyst used is hardly decreased in activity and the resulting polymer product is hardly colored.

Patent Document 9 discloses a process of using a specific phosphoric antioxidant on polymerization, and shows that a polymer product having an excellent property against coloring in contact with water can be attained without any inhibition on olefin polymerization.

As is clear from the aforementioned related arts, adding stabilizers on polymerization in fact has an advantage of eliminating the blending step of the stabilizers in the post-polymerization process, while on the other hand, has disadvantages such as lowering the polymerization catalyst activity and coloring the polymer product by an interaction between the catalyst metal and stabilizers. Therefore, addition during polymerization is required, and there have been problems that polymerization conditions and controls become complicated. Particularly for continuous polymerization, an extra reactor has been used for preliminary polymerization in conventional production plants.

As to the phenolic antioxidant, Patent Document 8 discloses that phenolic antioxidants conventionally used for polyolefin including tetrakis(3-(3,5-ditert-butyl-4-hydroxyphenyl)propionyloxymethyl)methane and the like are not suitable for addition before polymerization because they lower catalyst activity.

There are various kinds of processes for polyolefin polymerization including gas-phase polymerization, slurry polymerization and the like. For adding to the polymerization system before the polymerization, a stabilizer that inhibits polymerization when it is used alone is required to be treated with a masking agent before addition, and the masking agent is required to be eliminated with the help of water or the like when the catalyst is deactivated. However, the treatment with a masking agent such as an organic aluminum generally requires a large amount of an aliphatic solvent, so that a stabilizer having subjected to such a treatment is not suitable for gas-phase polymerization.

Patent Document 1: Japanese Patent Laid-Open Publication No. S50-108385 (particularly, in claims)

Patent Document 2: Japanese Patent Laid-Open Publication No. S57-63310 (particularly, in claims)

Patent Document 3: Japanese Patent Laid-Open Publication No. H02-255810 (particularly, in claims)

Patent Document 4: Japanese Patent Laid-Open Publication No. S61-130314 (particularly, in claims)

Patent Document 5: Japanese Patent Laid-Open Publication No. S61-181803 (particularly, in claims)

Patent Document 6: Japanese Patent Laid-Open Publication No. S63-92613 (particularly, in claims)

Patent Document 7: Japanese Patent Laid-Open Publication No. H02-53804 (particularly, in claims)

Patent Document 8: Japanese Patent Laid-Open Publication No. H05-271335 (particularly, in claims and comparative example 1)

Patent Document 9: Japanese Patent Laid-Open Publication No. H08-208731 (particularly, in claims)

DISCLOSURE OF INVENTION

Problems to be Solved by the Invention

There has been expected a phenolic antioxidant that can be used with a reduced amount of solvent on gas-phase polymerization and bring no adverse effects on catalyst activity even if the antioxidant is added before polymerization, and can provide a polymer product excellent in color and stability.

Means for Solving the Problems

In view of the above circumstances, the present inventors have made intensive studies and found that a monohydric phenolic antioxidant having an amide bonding exhibits an excellent solubility to an aliphatic solvent, and that, by adding the antioxidant preliminary masked with an organic aluminum into a catalyst system and/or a polymerization system, a polymer product excellent in stability can be obtained in a simple process without preliminary polymerization and also without inhibiting polymerization.

That is, the present invention provides a method for producing a polymer, comprising adding a phenolic antioxidant represented by general formula (I) and masked with an organic aluminum in a catalyst system or a polymerization system before polymerization when a monomer having an ethylenic unsaturated bonding is polymerized in a gas phase.

[Chemical 1]

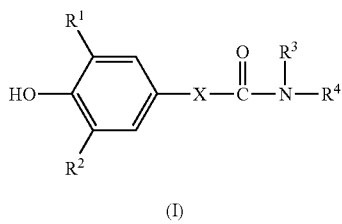

(I)

wherein $R^1$ and $R^2$, each is independently a hydrogen atom, an alkyl group having 1 to 9 carbon atoms, a cycloalkyl group or an arylalkyl group; X is an alkylene group having 1 to 8 carbon atoms; $R^3$ is a hydrogen atom or an alkyl group having 1 to 8 carbon atoms; and $R^4$ is an alkyl group having 1 to 30 carbon atoms.

BEST MODE FOR CARRYING OUT THE INVENTION

In the present invention, the phenolic antioxidant masked with an organic aluminum is given by treating an original phenol with an organic aluminum in a manner that the masked phenolic antioxidant can be converted to regenerate the original phenol by treating the masked phenolic antioxidant with a hydrogen donating compound such as water, alcohol and acid. The masked phenolic antioxidant includes, for example, aluminum phenoxide.

The catalyst used in the present invention may include a compound of a Group 3-11 transition metal of the periodic table (for example, Ti, Zr, Hf, V, Fe, Ni, Pd, Pt, Y and Sm). As a typical catalyst, there may be mentioned a Ziegler-Natta catalyst, a metallocene catalyst and a Brookhart catalyst (a compound of a Group 4-10 transition metal of the periodic table to which a hetero atom such as nitrogen, oxygen, sulfur and phosphorus is bonded).

The phenolic antioxidant used in the present invention is represented by general formula (I), and is used in an amount of from 0.001 to 10 parts by weight, and preferably from 0.05 to 5 parts by weight with respect to 100 parts by weight of resin.

The alkyl group having 1 to 9 carbon atoms represented by $R^1$ and $R^2$ may include methyl, ethyl, propyl, isopropyl, butyl, sec-butyl, tert-butyl, pentyl, sec-pentyl, tert-pentyl and the like. The cycloalkyl group may include cyclopentyl, cyclohexyl and the like. The arylalkyl may include benzyl, 1-methyl-1-phenylethyl and the like.

The alkylene group having 1 to 8 carbon atoms represented by X may include methylene, ethylene, propylene, trimethylene, tetramethylene, pentamethylene, 2,2-dimethyltrimethylene, hexamethylene, heptamethylene, octamethylene and the like.

The alkyl group having 1 to 8 carbon atoms represented by $R^3$ may include methyl, ethyl, propyl, isopropyl, butyl, sec-butyl, tert-butyl, pentyl, sec-pentyl, tert-pentyl, hexyl, heptyl, octyl, tert-octyl, 2-ethylhexyl, nonyl, decyl, undecyl, dodecyl, tridecyl, tetradecyl, pentadecyl, hexadecyl, heptadecyl, octadecyl and the like.

The alkyl group having 1 to 30 carbon atoms represented by $R^4$ may include methyl, ethyl, propyl, isopropyl, butyl, sec-butyl, tert-butyl, pentyl, sec-pentyl, tert-pentyl, hexyl, heptyl, octyl, tert-octyl, 2-ethylhexyl, nonyl, decyl, undecyl, dodecyl, tridecyl, tetradecyl, pentadecyl, hexadecyl, heptadecyl, octadecyl and the like.

The phenolic antioxidant represented by general formula (I) may include, more specifically, the following compounds No. 1 to 3. Note that, the present invention is in no way limited to the following compounds.

[Chemical 2]

Compound No. 1

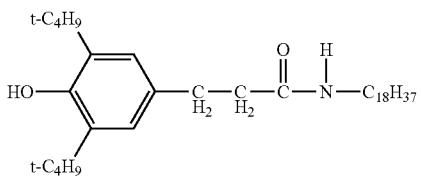

[Chemical 3]

Compound No. 2

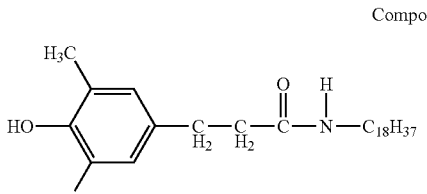

[Chemical 4]

Compound No. 3

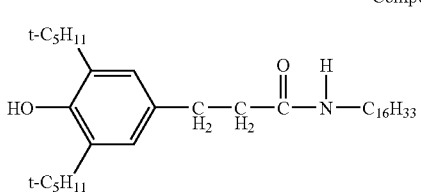

The phenolic antioxidant is masked by reacting with an organic aluminum compound such as trialkylaluminum. In the case where the by-product compound accompanied by the reaction brings no adverse effects on polymerization, the masked antioxidant is used as it is. When the by-product compound possibly inhibits polymerization, it is removed by vacuum distillation and other processes, and then the masked antioxidant is added to a polymerization system.

In the method for producing a stabilized polymer according to the present invention, olefins used for polymerization may include ethylene, propylene, 1-butene, 1-hexene, 3-methyl-1-butene, 3-methyl-1-pentene, 4-methyl-1-pentene, vinylcycloalkane, styrene and the derivatives thereof, and the like. Generally, known random copolymerization or block copolymerization may be also suitably used for the polymerization besides homo-polymerization. In particular, the method of the present invention is preferable for producing a polyolefin having a high molecular weight, because lowering in the molecular weight caused by kneading the added stabilizers can be avoided.

There is not any particular limitation on the method of the gas-phase polymerization, but any known methods can be used.

In the method for producing a polymer according to the present invention, the other additives used conventionally may be further added before or during polymerization as long as polymerization is not inhibited. The other additives may include phosphoric antioxidants, UV absorbers, hindered amine compounds, heavy metal inactivators, nucleating agents, flame retardants, metal soaps, hydrotalcite, fillers, lubricants, antistatic agents, pigments, dyes, plasticizers and the like.

The phosphoric antioxidants may include, for example, triphenyl phosphite, trisnonylphenyl phosphite, tris(2,4-ditert-butylphenyl)phosphite, tris(2,4-ditert-butyl-5-methylphenyl)phosphite, tris[2-tert-butyl-4-(3-tert-butyl-4-hydroxy-5-methylphenylthio)-5-methylphenyl]phosphite, tridecylphosphite, octyldiphenylphosphite, di(decyl) monophenyl phosphite, di(tridecyl)pentaerythritol diphosphite, di(nonylphenyl)pentaerythritol diphosphite, bis(2,4-ditert-butylphenyl) pentaerythritol diphosphite, bis(2,6-ditert-butyl-4-methylphenyl)pentaerythritol diphosphite, bis(2,4,6-tritert-butylphenyl)pentaerythritol diphosphite, bis(2,4-dicumylphenyl)pentaerythritol diphosphite, tetra(tridecyl) isopropylidene-diphenol diphosphite, tetra(tridecyl)-4,4'-n-butylidenebis(2-tert-butyl-5-methyl-phenol) diphosphite, hexa(tridecyl)-1,1,3-tris(2-methyl-4-hydroxy-5-tert-butylphenyl) butane triphosphite, tetrakis(2,4-ditert-butylphenyl)biphenylene diphosphonite, 9,10-dihydro-9-oxa-10-phosphaphenanthrene-10-oxide, 2,2'-methylenebis-(4,6-tert-butylphenyl)-2-ethylhexyl phosphite, 2,2'-methylenebis (4,6-tert-butylphenyl)-octadecyl phosphite, 2,2'-ethylidenebis(4,6-ditert-butylphenyl)fluorophosphite, tris(2-[(2,4,8,10-tetrakistert-butyldibenzo[d,f][1,3,2] dioxaphosphepin-6-yl)oxy]ethyl)amine, a phosphite of 2-ethyl-2-butylpropyleneglycol and 2,4,6-tritert-butylphenol and the like. A phosphoric antioxidant such as tris(2,4-ditert-butylphenyl)phosphite that brings no adverse effects on polymerization even if it is added before polymerization is preferable. The phosphoric antioxidant is used in an amount of from 0.001 to 3 parts by weight, and more preferably from 0.005 to 0.5 part by weight with respect to 100 parts by weight of monomers.

The aforementioned UV absorbers may include, for example, 2-(2'-hydroxyphenyl)benzotriazoles such as 2-(2'-hydroxyl-5'-methylphenyl)benzotriazole, 2-(2'-hydroxy-3', 5'-ditert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3', 5'-dicumylphenyl)benzotriazole and 2-(2'-hydroxy-3'-tert-butyl-5'-carboxy phenyl)benzo triazole; benzoates such as phenylsalicylate, resorcinol monobenzoate, 2,4-ditert-butylphenyl-3,5-ditert-butyl-4-hydroxybenzoate, 2,4-ditert-amylphenyl-3,5-ditert-butyl-4-hydroxyl-benzoate, and hexadecyl-3,5-ditert-butyl-4-hydroxybenzoate; 2-hydroxy-benzophenones such as 2,4-dihydroxybenzophenone, 2-hydroxy-4-methoxy-benzophenone, 2-hydroxy-4-octoxy-benzophenone, and 5,5'-methylenebis(2-hydroxy-4-methoxybenzophenone); cyanoacrylates such as ethyl-a-cyano-β, β-diphenylacrylate and methyl-2-cyano-3-methyl-3-(p-methoxyphenyl)acrylate; and triaryltriazines such as 2-(2-hydroxy-4-octoxyphenyl)-4,6-bis(2,4-ditert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-ditert-butylphenyl)-s-triazine, and the like. The UV absorbers are used in an amount of from 0.001 to 5 parts by weight, and more preferably from 0.005 to 0.5 part by weight with respect to 100 parts by weight of monomers.

The aforementioned hindered amine photo-stabilizers may include, for example, a hindered amine compound such as 2,2,6,6-tetramethyl-4-piperidylstearate, 1,2,2,6,6,-pentamethyl-4-piperidylstearate, 2,2,6,6-tetramethyl-4-piperidylbenzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)di(tridecyl)-1,2,3,4-butanetetracarboxylate, bis(1,2,2,6,6-pentamethyl-4-piperidyl)di(tridecyl)-1,2,3,4-butanetetracarboxylate, bis(1, 2,2,4,4-pentamethyl-4-piperidyl)-2-butyl-2-(3,5-ditert-butyl-4-hydroxybenzyl)malonate, 1-(2-hydroxyethyl)-2,2,6, 6-tetramethyl-4-piperidinol/diethylsuccinate polycondensate, 1,6-bis(2,2,6,6,-tetramethyl-4-piperidilamino)hexane/2,4-dichloro-6-morpholino-s-triazine polycondensate, 1,6-bis(2,2,6,6,-tetramethyl-4-piperidylamino) hexane/2,4-dichloro-6-tert-octylamino-s-triazine polycondensate, 1,5,8,12-tetrakis[2,4-bis(N-butyl-N-(2,2,6, 6-tetramethyl-4-piperidyl)amino)-s-triazine-6-yl]-1,5,8,12-tetraaza-dodecane, 1,5,8,12-tetrakis[2,4-bis(N-butyl-N-(1,2, 2,6,6-pentamethyl-4-piperidyl)amino)-s-triazine-6-yl]-1,5, 8-12-tetraazadodecane, 1,6,11-tris[2,4-bis(N-butyl-N-(2,2, 6,6-tetramethyl-4-piperidyl)amino)-s-triazine-6-yl] aminoundecane, and 1,6,11-tris[2,4-bis(N-butyl-N-(1,2,2,6, 6-pentamethyl-4-piperidyl)amino)-s-triazine-6-yl] aminoundecane.

There is not any particular limitation on the use of the polymer obtained by the present invention, but the polymer is used in the form of known extruded moldings, injection moldings, hollow moldings, blow moldings, film moldings, sheet moldings, and other moldings for applications such as automobile parts, building materials, agricultural materials, packaging materials, daily goods, and toys.

EXAMPLES

The present invention will be exemplified with reference to the following examples, but the invention is not limited to these examples.

Example 1

Preparation of Solid Ti Catalyst Component

A mixture of 4.76 g (50 mmol) of anhydrous magnesium chloride, 25 ml of decane, and 23.4 ml (150 mmol) of 2-ethylhexylalcohol was heated and reacted at 13° C. for 2 hours to obtain a uniform solution. To the solution, 1.11 g (7.5 mmol) of phthalic anhydride were added, and further the mixed solution was stirred and reacted at 130° C. for 1 hour so as to dissolve the phthalic anhydride. Thus obtained uniform solution was cooled to the room temperature, and then all of the solution was added dropwise in 200 ml (1.8 mmol) of titanium tetrachloride kept at −20° C. over 1 hour. After the solution was fully enclosed, the temperature of the resulting mixed solution was elevated to 110° C. over 4 hours. When the temperature reached 110° C., 2.68 ml (12.5 mmol) of diisobutylphthalate were added to the mixed solution, which was then kept at the same temperature for 2 hours while stirring. After that, the resulting solid was collected by hot filtration. The solid was suspended again in 200 ml of titanium tetrachloride, and then heated and reacted again at 1110° C. for 2 hours. After that, the solid was collected again by hot filtration, and washed sufficiently with decane and hexane having a temperature of 1110° C. until no free titanium compound was detected in the washing solution. Thus synthesized solid Ti catalyst component was stored in the form of a heptane slurry, but part of the solid was dried so as to evaluate the catalyst composition. The solid Ti catalyst component contained 2.6 wt % of titanium, 56.0 wt % of chlorine, 17.0 wt % of magnesium, and 20.9 wt % of isobutylphthalate.

(Pretreatment of Additive)

To 50 ml of heptanes, triethylaluminum and a phenolic antioxidant shown in Table 1 were added in a mole ratio of 3:1 in terms of functional group in a total amount of 5.0 g, and then the mixture was stirred at room temperature for 2 hours to obtain a stabililzer solution that was inactivated against catalysts.

Examples 1-1 and 1-2

In a 1,000 ml autoclave purged with nitrogen gas, 400 ml of heptane were poured. Triethylaluminum (1.3 mmol), dicyclopetadimethoxysilane (0.13 mmol), and the heptane slurry of the Ti catalyst (0.0026 mmol as Ti) were also added successively. The autoclave was purged with propylene, and preliminary polymerization was performed at 35° C. for 10 minutes under a propylene pressure of 1 kgf/cm$^2$G. After the propylene was purged and the pressure was released, 150 ml (23° C.) of hydrogen were introduced and the temperature was elevated to 60° C. The autoclave was pressurized with propylene at 5 kgf/cm$^2$G and the temperature was kept at 70° C. Propylene was provided to polymerize for 1 hour while keeping the pressure inside of the autoclave at 5 kgf/cm$^2$G. After the system was purged with nitrogen gas, the supernatant heptane was decanted while the resulting polypropylene was left in the autoclave. A vacuum pump was connected to the autoclave, and then the heptane was distilled out under a reduced pressure to obtain dried polypropylene. Part of the polypropylene was taken out of the system while keeping the system in a nitrogen gas atmosphere, and 10 g of the polypropylene were left in the autoclave. To the polypropylene powder that was left in the autoclave and served as a dispersing medium were added successively triethylaluminum (3.9 mmol), dicyclopentadimethoxysilane (0.39 mmol), the heptane slurry of the Ti catalyst (0.0078 mmol as Ti), and a phenolic antioxidant (0.08 mmol) and a phosphoric antioxidant (0.08 mmol) shown in Table 1. The autoclave was purged with propylene, and then the propylene was removed so as to release the pressure. After that, 150 ml (23° C.) of hydrogen were introduced, and then propylene was provided to polymerize in a gas phase at a pressure of 5 kgf/cm$^2$G at 70° C. for 1 hour. After polymerization, propylene was purged and replaced by nitrogen gas. While 10 g of thus purified polypropylene were left, the remainder was taken out of the autoclave. After that, triethylaluminum (3.9 mmol), dicyclopentadimethoxysilane (0.39 mmol), the heptane slurry of the Ti catalyst (0.0078 mmol as Ti), and a phenolic antioxidant (0.08 mmol) and a phosphoric antioxidant (0.08 mmol) shown in Table 1 were added successively to the autoclave. The autoclave was purged with propylene, and then the propylene was removed so as to release the pressure. After that, 150 ml (23° C.) of hydrogen were introduced, and then propylene was provided to polymerize in a gas phase at a pressure of 5 kgf/cm$^2$G at 70° C. for 1 hour. After the gas-phase polymerization was repeated similarly, the resulting polypropylene was fully admixed with 5 ml of ethanol. They were mixed sufficiently, and then all of the polypropylene powder was taken out of the autoclave and dried under vacuum at 40° C. for 5 hours.

Comparative Example 1-1

A similar process to Example 1-1 was carried out, except that the phenolic antioxidant was not added before the gas-phase polymerization.

Comparative Example 1-2

A similar process to Example 1-1 was carried out, except that the phenolic antioxidant was replaced by stearyl-3-(3,5-ditert-butyl-4-hydroxyphenyl)propionate.

Comparative Example 1-3

A similar process to Example 1-1 was carried out, except that the phenolic antioxidant without pretreating was added to the autoclave after the Ti catalyst was added to the autoclave.

Examples 2-1 and 2-2

A similar process to Example 1 was carried out, except that dicyclopentyldimethoxysilane used in Example 1 was replaced by cyclohexylmethyldimethoxysilane, and that 130 ml (23° C.) of hydrogen were used in the gas-phase polymerization.

(Evaluation of Effect on Catalyst Activity)

The effect on catalyst activity was evaluated in terms of the yield (g-PP/g-cat) per 1 g of catalyst and the molecular weight of the resulting polypropylene. As to the molecular weight, the weight average molecular weight and molecular weight distribution (Mw/Mn) were measured by gel permeation chromatography (an apparatus of GPC2000 manufactured by Waters Corp.; two columns of Styragel HT6E and one column of Styragel HT2 both manufactured by Waters Corp.; at a temperature of 145° C.; and a solvent of ortho-dichlorobenzene; and in a concentration of 4 mg/10 g). Note that, on calculating the yield, 10 g of the dispersing medium that was left in the autoclave on the gas-phase polymerization were eliminated.

25 g of each polymer powder resin obtained in Examples and Comparative Examples were kept at 120° C. for 4 hours with a Window Screen Fogging Tester (manufactured by Suga Test Instruments Co., Ltd). When the antioxidant was decomposed and vaporized from the polymer sample, the antioxidant was collected on the screen. The stability of the antioxidant against the interaction with the catalyst was evaluated by the haze of the screen.

TABLE 1

| | Stabilizer | Effect on catalyst activity g-PP/g-cat | Molecular weight | Molecular weight distribution Mw/Mn | Vaporization |
|---|---|---|---|---|---|
| Example 1-1 | Compound No. 1 | 2,900 | 399,000 | 5.1 | 0.3 |
| Example 1-2 | Compound No. 1/Phosphoric antioxidant*1 | 3,200 | 402,000 | 4.9 | 0.3 |
| Comparative Example 1-1 | None | 3,000 | 404,000 | 5.1 | 0.3 |
| Comparative Example 1-2 | Comparative compound 1*2 | 2,800 | 400,000 | 4.8 | 9.6 |
| Comparative Example 1-3 | Compound No. 1*3 | 2,000 | 388,000 | 4.8 | 0.3 |
| Example 2-1 | Compound No. 1 | 3,300 | 367,000 | 4.8 | 0.3 |
| Example 2-2 | Compound No. 1/Phosphoric antioxidant*1 | 3,400 | 371,000 | 4.9 | 0.3 |

*1 A 1/1 mixture of compound No. 1/tris(2,4-ditert-butylphenyl) phosphite
*2 Stearyl-3-(3,5-ditert-butyl-4-hydroxyphenyl) propionate
*3 Compound No. 1 was not preliminary treated with an organic aluminum but added after the Ti catalyst were added and before the propylene monomers were fed.

Evaluation for Processing Stability

Each polypropylene powder obtained by Examples 1-1, 1-2, 2-1 and 2-2, and Comparative Example 1-1, and a blend of Referenced Example 1-1 obtained by mixing 100 parts by weight of the polypropylene powder obtained in Example 1-1 and 0.05 part by weight of tris(2,4-ditert-butylphenyl)phosphite were subjected to the melt flow rate measurement in accordance with JIS K 7210 (under a load of 1.85 kg at 230° C.). The results are shown below.

Example 1-1: 3.0 g/minute

Example 1-2: 1.8 g/minute

Example 2-1: 3.4 g/minute

Example 2-2: 2.1 g/minute

Comparative Example 1-1: 6.0 g/minute

Referenced Example 1-1: 2.4 g/minute

The above evaluation for processing stability clearly shows that a polypropylene resin composition having an excellent processing stability can be obtained with a high energy efficiency, without inhibiting the polymerization activity of the catalyst, by using in combination a phosphoric antioxidant and a compound of the present invention given by masking a compound represented by general formula (I) with an organic aluminum.

It is clear from the results of Example 1-1 and Comparative Examples 1-1 and 1-3 that the phenolic antioxidant of the present invention having a specific structure and masked with an organic aluminum hardly causes polymerization inhibition that is seen in Comparative Example 1-3 in which the antioxidant is blended without masking. In the case where an antioxidant other than the specific antioxidant of the present invention is used, a stabilizing effect can be obtained, but considering the result of vaporization in Comparative Example 1-2, the antioxidant is decomposed by an action of the catalyst and a large amount of volatile matters is generated. Therefore, it is anticipated that, if the antioxidant is used for the stabilization of a practical polymer product, the volatile matters spout to the surface of the polymer product or stick to the surface of the other products. From the reasons mentioned above, it is also clear that the specific compound of the present invention provides an excellent performance when it is added on polymerization.

The solubility of the antioxidant was evaluated in the following manner. The solubility of the antioxidant was rated as "Good" when 1 mol of the aluminum phenoxide was dissolved in 1 liter of heptane at 25° C. While, the solubility was rated as "Poor" when not dissolved. The results are shown in Table 2.

TABLE 2

| | Solubility |
|---|---|
| Compound No. 1 | Good |
| Comparative compound 2*4 | Poor |
| Comparative compound 3*5 | Poor |

*4 1,6-hexamethylenebis[(3,5-ditert-butyl-4-hydroxyphenyl) propionic acid amide]
*5 1,1,3-tris(2-methyl-4-hydroxy-5-tert-butyl-phenyl) butane The aluminum phenoxide that is a phenolic antioxidant having an amide bonding according to the present invention exhibits an excellent solubility, so that the amount of the solvent required for the organic aluminum treatment can be reduced, and that the amount of the solvent accompanied with the antioxidant added in the gas-phase polymerization can be reduced. In this way, it is clear that the specific compound of the present invention has an excellent effect on stabilizing the gas-phase polymerization.

In order to confirm that a phenolic antioxidant was masked or not after the phenolic antioxidant was reacted with trialkylaluminum, the compound No. 1 before and after masking was subjected to the $^1$H-NMR measurement.

Before masking, a spectrum with the following peaks was observed:

7.0-7.1 ppm: Ph-H, 5.1-5.5 ppm: N—H (acid amide), 5.0-5.1 ppm: O—H (phenol), 3.0-3.4 ppm: N—CH2-alkyl, 2.3-3.0 ppm: Ph-CH2-CH2-C=O, and 0.7-1.8 ppm: the other alkyl groups.

After masking:

the peaks at 5.1-5.5 ppm assigned to N—H (acid amide) and at 5.0-5.1 ppm assigned to O—H (phenol) disappeared;

the peak assigned to N—CH2-alkyl was shifted from 3.0-3.4 ppm to 3.4-3.6 ppm, and the peaks assigned to Ph-CH2-CH2-C=O was shifted from 2.3-3.0 ppm to 2.8-3.4 ppm;

further, after ethanol treatment, the peaks at 5.1-5.5 ppm and 5.0-5.1 ppm were recovered, and the shifted peaks were also restored.

The reason why polymerization inhibition was suppressed by the reaction with trialkylaluminum is that phenols, that coordinated to the polymerization catalyst and lowered the polymerization activity or inhibited the chain reaction of polymerization, possibly disappeared substantially in the polymerization system because of phenolate formation with aluminum and the like. It is also considered that the resin showed a stabilizing effect because the phenols were regenerated in the catalyst inhibition process with ethanol.

In the method according to the present invention, a specific phenolic antioxidant masked with an organic aluminum is fed into a polymerization system and/or a catalyst system before or during polymerization, so that a phenolic antioxidant can be blended into a polymer, without inhibiting polymerization, with a higher thermal efficiency as compared with addition process by kneading. The antioxidant is hardly decomposed, so that it can provide an excellent stabilizing effect without any adverse effect caused by decomposed products. In addition, the antioxidant exhibits a high solubility to an aliphatic organic solvent. In this way, on gas-phase polymerization, the phenolic antioxidant of the present invention having an amide bonding and treated with an organic aluminum is added in a catalyst system or a polymerization system before or during polymerization, whereby the stabilized polymer can be obtained with a high energy efficiency.

INDUSTRIAL APPLICABILITY

A monohydric phenolic antioxidant having an amide bonding and masked with an organic aluminum is added before polymerization on gas-phase polymerization in accordance with the present invention, whereby the stabilized polymer can be obtained with a high energy efficiency and a reduced amount of solvent incorporated into a polymerization reactor.

The invention claimed is:

1. A method for producing a stabilized polymer comprising:
adding at least one kind of a phenolic antioxidant masked with an organic aluminum and represented by general formula (I) in a catalyst system or a polymerization system, before or during polymerization, on gas-phase polymerization of a monomer having an ethylenic unsaturated bonding,

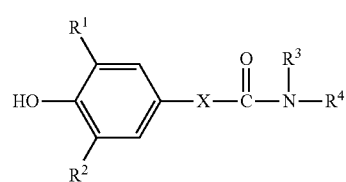

(I)

wherein $R^1$ and $R^2$, each is independently a hydrogen atom, an alkyl group having 1 to 9 carbon atoms, a cycloalkyl group or an arylalkyl group; X is an alkylene group having 1 to 8 carbon atoms; $R^3$ is a hydrogen atom or an alkyl group having 1 to 8 carbon atoms; and $R^4$ is an alkyl group having 1 to 30 carbon atoms.

2. The method for producing a stabilized polymer according to claim 1, wherein the catalyst for the polymerization is a transition metal catalyst.

3. The method for producing a stabilized polymer according to claim 1, wherein the catalyst for the polymerization is a Ziegler-Natta catalyst.

4. The method for producing a stabilized polymer according to claim 1, wherein the polymer produced is a propylene homopolymer, or a copolymer of propylene and ethylene and/or an α-olefin.

5. The method for producing a stabilized polymer according to claim 1, wherein the molar ratio of the phenolic compound represented by general formula (I) to aluminum which is contained in the organic aluminum used to mask the phenolic compound is from 0.3 to 0.4.

6. The method for producing a stabilized polymer according to claim 1, wherein masking treatment is performed in an aliphatic solvent.

7. The method for producing a stabilized polymer according to claim 1, wherein a phosphoric antioxidant is further added in the catalyst system or the polymerization system before or during polymerization.

8. The method for producing a stabilized polymer according to claim 2, wherein the polymer produced is a propylene homopolymer, or a copolymer of propylene and ethylene and/or an α-olefin.

9. The method for producing a stabilized polymer according to claim 2, wherein the molar ratio of the phenolic compound represented by general formula (I) to aluminum which is contained in the organic aluminum used to mask the phenolic compound is from 0.3 to 0.4.

10. The method for producing a stabilized polymer according to claim 2, wherein masking treatment is performed in an aliphatic solvent.

11. The method for producing a stabilized polymer according to claim 2, wherein a phosphoric antioxidant is further added in the catalyst system or the polymerization system before or during polymerization.

12. The method for producing a stabilized polymer according to claim 3, wherein the polymer produced is a propylene homopolymer, or a copolymer of propylene and ethylene and/or an α-olefin.

13. The method for producing a stabilized polymer according to claim 3, wherein the molar ratio of the phenolic compound represented by general formula (I) to aluminum which is contained in the organic aluminum used to mask the phenolic compound is from 0.3 to 0.4.

14. The method for producing a stabilized polymer according to claim 3, wherein masking treatment is performed in an aliphatic solvent.

15. The method for producing a stabilized polymer according to claim 3, wherein a phosphoric antioxidant is further added in the catalyst system or the polymerization system before or during polymerization.

16. The method for producing a stabilized polymer according to claim 4, wherein the molar ratio of the phenolic compound represented by general formula (I) to aluminum which is contained in the organic aluminum used to mask the phenolic compound is from 0.3 to 0.4.

17. The method for producing a stabilized polymer according to claim 4, wherein masking treatment is performed in an aliphatic solvent.

18. The method for producing a stabilized polymer according to claim 4, wherein a phosphoric antioxidant is further added in the catalyst system or the polymerization system before or during polymerization.

19. The method for producing a stabilized polymer according to claim 5, wherein masking treatment is performed in an aliphatic solvent.

20. The method for producing a stabilized polymer according to claim 5, wherein a phosphoric antioxidant is further added in the catalyst system or the polymerization system before or during polymerization.

* * * * *